(12) United States Patent
Blöcher et al.

(10) Patent No.: US 10,089,206 B2
(45) Date of Patent: Oct. 2, 2018

(54) MONITORING REDUNDANT COMPONENTS

(71) Applicant: SIEMENS AKTIENGESELLSCHAFT, München (DE)

(72) Inventors: Uwe Blöcher, Puchheim (DE); Jens-Uwe Bußer, Neubiberg (DE); Rainer Falk, Poing (DE); Volker Fusenig, München (DE)

(73) Assignee: Siemens Aktiengesellschaft, München (DE)

( * ) Notice: Subject to any disclaimer, the term of this patent is extended or adjusted under 35 U.S.C. 154(b) by 92 days.

(21) Appl. No.: 14/906,383

(22) PCT Filed: Jun. 18, 2014

(86) PCT No.: PCT/EP2014/062809
§ 371 (c)(1),
(2) Date: Jan. 20, 2016

(87) PCT Pub. No.: WO2015/010831
PCT Pub. Date: Jan. 29, 2015

(65) Prior Publication Data
US 2016/0162383 A1 Jun. 9, 2016

(30) Foreign Application Priority Data
Jul. 23, 2013 (DE) .................. 10 2013 214 398

(51) Int. Cl.
*G06F 11/00* (2006.01)
*G06F 11/30* (2006.01)
(Continued)

(52) U.S. Cl.
CPC .......... *G06F 11/3048* (2013.01); *G06F 11/16* (2013.01); *G06F 11/3024* (2013.01);
(Continued)

(58) Field of Classification Search
CPC .................................................. G06F 11/3048
See application file for complete search history.

(56) References Cited

U.S. PATENT DOCUMENTS

| | | | | |
|---|---|---|---|---|
| 7,313,739 | B2 * | 12/2007 | Menon | G01R 31/318508 365/201 |
| 7,886,195 | B2 * | 2/2011 | Mayer | G06F 11/3648 714/38.1 |

(Continued)

FOREIGN PATENT DOCUMENTS

| | | |
|---|---|---|
| DE | 102011007387 A1 | 10/2012 |
| DE | 102011078309 A1 | 1/2013 |
| WO | WO2012061663 A2 | 5/2012 |

OTHER PUBLICATIONS

"Digital Signal Processing", Indian Institute of Technology Delhi.
(Continued)

*Primary Examiner* — Christopher S McCarthy
(74) *Attorney, Agent, or Firm* — Lempia Summerfield Katz LLC

(57) ABSTRACT

A device for monitoring a component has at least one processor core and a further processor core. The device further includes a determining unit configured to determine a profile of the processor core, the profile being influenced by an input signal applied to the processor core, and to determine a further profile of the further processor core, the further profile being influenced by a further input signal applied to the further processor core. The device further includes a comparison unit configured to compare the profile and the further profile and to generate a fault signal, if a comparison result of a comparison carried out by the comparison unit indicates defective similarity of the profile to the further profile.

35 Claims, 1 Drawing Sheet

(51) Int. Cl.
  *G06F 11/16* (2006.01)
  *G06F 11/32* (2006.01)
  *G06F 11/34* (2006.01)
  *G06F 21/75* (2013.01)
(52) U.S. Cl.
  CPC ........ *G06F 11/3058* (2013.01); *G06F 11/328* (2013.01); *G06F 11/3409* (2013.01); *G06F 21/755* (2017.08); *G06F 11/1641* (2013.01); *G06F 2201/81* (2013.01); *G06F 2201/86* (2013.01)

(56) References Cited

U.S. PATENT DOCUMENTS

| | | | |
|---|---|---|---|
| 2007/0074011 A1 | 3/2007 | Borkar et al. | |
| 2011/0173432 A1* | 7/2011 | Cher | G06F 17/5045 713/100 |
| 2011/0271161 A1 | 11/2011 | Kursun et al. | |
| 2013/0124901 A1* | 5/2013 | Mayer | G06F 1/32 713/340 |
| 2013/0318607 A1 | 11/2013 | Reed et al. | |

OTHER PUBLICATIONS

"Power Fingerprinting"; www.powerfingerprinting.com/technology.html, viewed Jul. 15, 2013.

"XC2300 and CIC61508 Cost-Optimized Safety Computing Platform", www.infineon.com/sil, Infineon Technologies AG, 2012.

CIC61508—signature watchdog, http://www.infineon.com/cms/de/product/microcontrollers/companion-ic-family/cic61, viewed Jul. 15, 2013.

Gough, Peter T., "Signal processing and correlation techniques", Acoustics Research Group, Department of Electrical and Computer Engineering, University of Canterburry, Christchurch, New Zealand, http://pollux.dhcp.uia.mx/manuales/Filtros/UIA_correlation.pdf, available Dec. 19, 2003.

PCT International Search Report and Written Opinion of the International Searching Authority dated Sep. 29, 2014 for corresponding PCT/EP2014/062809, with English Translation.

Stein, Jonathan Y., "Correlation", Digital Signal Processing: A Computer Science Perspective, pp. 349-392, 2000.

* cited by examiner

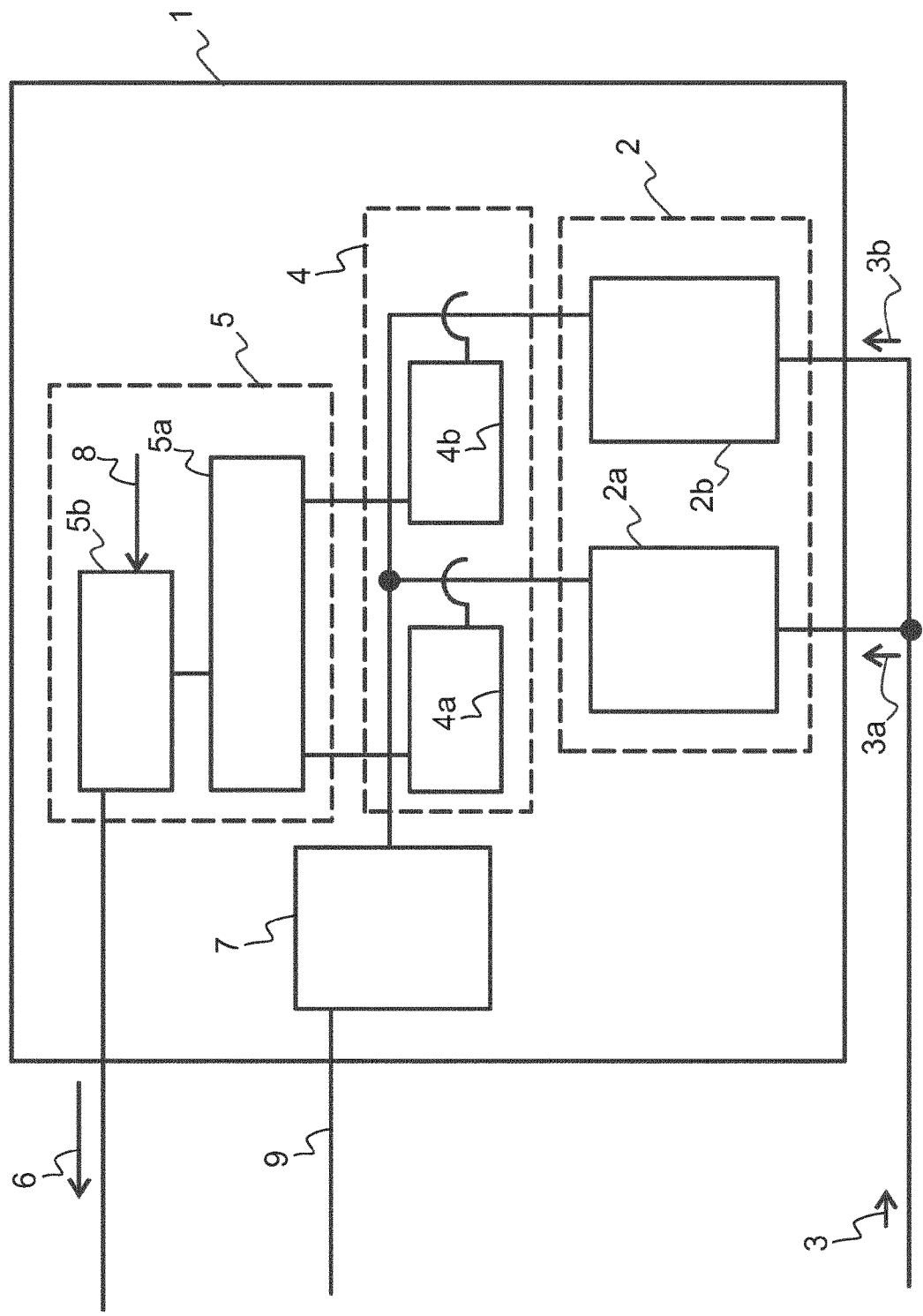

MONITORING REDUNDANT COMPONENTS

The present patent document is a § 371 nationalization of PCT Application Serial Number PCT/EP2014/062809, filed Jun. 18, 2014, designating the United States, which is hereby incorporated by reference, and this patent document also claims the benefit of DE 10 2013 214 398.2, filed on Jul. 23, 2013, which is also hereby incorporated by reference.

TECHNICAL FIELD

The present embodiments relate to the technical field of monitoring of a component including at least one processor core.

BACKGROUND

In industrial communications, a correct function is of highest importance. This applies, in particular, in safety-critical control systems (e.g., railroad automation, energy network automation, production automation, process automation).

"Power fingerprinting" for detecting manipulated devices is known, for example, from WO 2012/061663. Here, the power consumption of a device is analyzed and compared with a reference power consumption profile in order to detect a malfunction or a manipulation through malware.

Self-monitoring of a gateway is known from patent application DE 10 2011 007 387. A check is carried out here to determine whether a corresponding incoming data packet has been received for an outgoing data packet. It may thereby be provided that a gateway does not itself generate data packets in the event of a malfunction.

An encryption component with self-monitoring is known from patent application DE 10 2011 078 309. This provides a switching signal if a VPN tunnel has been correctly set up.

A safety computing platform is known, in which a safety monitor circuit CIC61508 monitors a main processor and the software execution on the main processor. It may, in particular, carry out tests against fixed test patterns and compare results of two independent executions. (see http://www.infineon.com/dgd1/Safety-Computing-Platform-XC2300-CIC61508-Product-Brief.pdf?folderId=
db3a304317a748360117f45a9c863e84&fileId=
db3a3043353fdc16013543303497315d.) Features are also described in: http://www.infineon.com/cms/de/product/microcontrollers/companion-ic-family/cic61508-signature-watchdog/channel.html?channel=db3a30432dbf3762012dc800293d362b.

Multi-channel processors are known from the safety environment. In the processors, a calculation is performed in hardware with multiple redundancies. Coded processing is furthermore known in which the same calculation is performed on hardware with differently coded data.

The calculation of the cross-correlation between two signals is a known method for signal processing. It is used, e.g., in receivers in order to decode a signal (see, e.g., http://www.iitrc.ac.in/outreach/web/CIRCIS/PG/AVN/SP/Digital%20signal%20processing. pdf slide 44ff., http://pol-lux.dhcp.uia.mx/manuales/Filtros/UIA_correlation.pdf, http://dsp-book.narod.ru/DSPCSP/14.pdf).

Fault signaling contacts are furthermore known. These contacts indicate the failure of a device by a change of status (e.g., open/closed), for example, in the event of loss of the voltage supply or in the event of internal faults. This contact is wired separately from the communication lines (e.g., Ethernet or the like) and enables a status determination even if the device may no longer respond to inquiries via the communication line.

Protection against random and also systematic faults is provided through suitable safety measures. However, protection against deliberate attacks (e.g., IT security) is also required to an increasing extent. The aim, however, is to provide that established safety mechanisms are not influenced by security measures.

SUMMARY AND DESCRIPTION

A need exists for effective information technology (IT) security measures that are suitable for control environments. The underlying object of the present embodiments is to meet this need.

The scope of the present invention is defined solely by the appended claims and is not affected to any degree by the statements within this summary. The present embodiments may obviate one or more of the drawbacks or limitations in the related art.

According to a first aspect, a method for monitoring a component is provided. The component includes at least one processor core. According to the method, an input signal is applied to the processor core. A further input signal is applied to a further processor core. A profile of the processor core influenced by the application of the input signal to the processor core is determined. A further profile of the further processor core influenced by the application of the further input signal to the further processor core is determined. The profile and the further profile are compared. An insufficient similarity between the profile and the further profile is interpreted as an indication of a malfunction of the component. In particular, it may thus be detected, for example, whether the monitored component is manipulated.

According to a further aspect, a device for monitoring a component having at least one processor core is provided. The device includes the component to be monitored, a further processor core, a determination unit and a comparison unit. The determination unit is designed to determine a profile of the processor core. The profile is influenced by an input signal applied to the processor core. Furthermore, the determination unit is designed to determine a further profile of the further processor core. The further profile is influenced by a further input signal applied to the further processor core. The comparison unit is designed to compare the profile and the further profile and to generate a fault signal if a comparison result of a comparison carried out by the comparison unit is an insufficient similarity between the profile and the further profile.

BRIEF DESCRIPTION OF THE DRAWING

FIG. 1 depicts a two-channel processor with two processor cores according to one embodiment.

DETAILED DESCRIPTION

FIG. 1 depicts a device 1 designed as a monitoring unit according to one embodiment. The monitoring unit 1 includes a component 2 to be monitored, a determination unit 4, and a comparison unit 5. The component 2 includes a processor core 2a and a further processor core 2b. The monitoring unit 1 is suitable for monitoring the component 2 or the processor core 2a and/or the processor core 2b.

Since the monitoring unit is designed to monitor the component 2, it is also designed to at least partially monitor the monitoring unit 1.

Furthermore, the monitoring unit 1 also includes an energy unit 7, for example, a transformer that transforms the voltage of an external electrical energy supply 9 to a suitable voltage level and supplies it to the component 2 or to the processor cores 2a, 2b.

The determination unit 4 is designed to determine a profile of the processor core 2a influenced by an input signal 3a applied to the processor core 2a and to determine a further profile of the further processor core 2b influenced by a further input signal 3b applied to the further processor core 2b. In the present example embodiment, the input signals 3, 3a, 3b are identical and are applied simultaneously to both processor cores via the same line. In alternative example embodiments described below, the input signals 3a and 3b are not identical.

According to the embodiment depicted in FIG. 1, the determination unit 4 includes a current-measuring unit 4a designed as a sensor 4a and a further current-measuring unit 4b designed as a further sensor 4b. The current-measuring unit 4a is designed to determine the profile of the processor core 2a, whereas the current-measuring unit 4b is designed to determine the further profile of the further processor core 2b.

According to the embodiment depicted in FIG. 1, the comparison unit 5 includes a cross-correlator 5a designed to perform a cross-correlation of the profile and the further profile and supply the result of the cross-correlation to a comparator 5b. The cross-correlator 5a is similarly part of the comparison unit 5. The comparator 5b compares the result of the cross-correlation with a threshold value 8. If the result of the cross-correlation exceeds the threshold value 8, and it may be inferred therefrom that the profile and the further profile are sufficiently similar, e.g., they correspond sufficiently to one another. This sufficient similarity between the profile and the further profile is interpreted as an indication of a fault-free operation of the component 2. Conversely, if the result of the cross-correlation falls below the threshold value 8, it may be inferred therefrom that the profile and the further profile do not correspond sufficiently to one another, e.g., the similarity between the profile and the further profile is insufficient. This insufficient similarity between the profile and the further profile is interpreted as an indication of a malfunction of the component 2. The comparison unit 5 is thus designed to compare the profile and the further profile and generate a comparison result on the basis of the comparison. If the comparison result of a comparison carried out by the comparison unit 5 is an insufficient similarity between the profile and the further profile, this is interpreted as an indication of a malfunction of the component 2, for example in that the comparison unit generates a fault signal 6 as a status signal.

In other words, FIG. 1 depicts a two-channel (e.g., dual-lane) processor 1 with two CPUs 2a, 2b. A safety watchdog, which, for example, compares the calculation results of the two channels 2a, 2b, may also be present.

According to the embodiment depicted in FIG. 1, a sensor 4a, 4b is provided for each channel 2a, 2b, which measures the current consumption of the respective channel 2a, 2b and in each case outputs a signal including the respective current consumption profile. These two signals are made available to the cross-correlation unit 5a that determines the cross-correlation of the two current consumption profiles. This may be performed, for example, by a Digital Signal Processor (DSP) or Field-Programmable Gate Array (FPGA).

The result is compared with a fixed or predefinable threshold value 8. If the threshold value 8 is exceeded, a normal operational state prevails, e.g., the two channels 2a, 2b indicate a sufficiently similar current characteristic profile. This may be supplied as a status signal 6.

In a different variant, for example, if the threshold value 8 is understepped, a reset is triggered (e.g., by supplying a corresponding signal to a safety watchdog) or output modules to which control signals are supplied are switched to an inactive state (e.g., high-impedance or 0V or to an invalid output value).

Different sensors or a plurality of sensors of a channel 2a, 2b may also be provided. One, both, or all of the CPUs 2a, 2b may in each case also have an integrated sensor that measures the current consumption profile. A multi-core CPU may provide one sensor for each core and an integrated correlation unit 5a and an integrated threshold value comparison unit 5b. A multi-channel CPU (e.g., multi-core CPU) may thereby internally compare a plurality of processor cores. The current consumption of further components of a channel, (e.g., input/output modules, communication interfaces, memory modules), may also be measured. In one variant, the comparison unit 5 (including the cross-correlation unit 5a and the comparison unit 5b) is configurable, and the processor cores to be monitored may be specified. If, for example, 4 processor cores (Core0, Core1, Core2, Core3) are provided, it may be configured, for example, that Core0 and Core3 are to be checked. In certain embodiments, more than two channels may be monitored. Thus, for example, Core0, Core1, and Core3 may be monitored in order to determine whether their current consumption/radiation profiles are in each case sufficiently strongly correlated in pairs.

The alarm designed as a fault signal may be transmitted, for example, via the cabling of the fault signaling contact in that the comparator 5b similarly provides its own fault signaling contact connected in series with the fault signaling contact of the device. A signal via the cabling of the fault signaling contact then means that either the device has failed or the comparator has detected an anomaly (or both simultaneously). A distinction cannot be made, however, between these possibilities since only 1 bit may be transmitted. If a distinction between the alarm of the comparator and a device failure is desired, the fault signaling contact of the comparator is connected via its own cabling to a monitoring device.

According to one embodiment, the first starting point is the known power fingerprinting in which an actual current consumption is compared with a reference pattern. The second starting point is a safety watchdog that checks the similarity of the two data results.

According to the embodiment depicted in FIG. 1, it is thus proposed to compare the current consumption profile of at least two redundant implementations of current consumption profiles of the two processor cores 2a, 2b through cross-correlation. A safety monitor is thereby implemented, not at data level, but at current consumption level. A safety monitor monitors a computing system 1, 2. If an illegal state is detected, an alarm signal, for example, may be supplied as a status signal 6. The monitoring unit 1 or an external system monitored by the monitoring unit 1, the component 2 or by the monitoring unit 1, or by the component 2, may be made to perform a restart, (e.g., a reboot), or may be switched to an intrinsically safe state. In particular, fault attacks, also referred to as fault injection attacks, are thus significantly hindered, since both processor cores 2a, 2b is manipulated for a successful attack in such a way that they have an identical fault behavior. In one variant, the first processor core 2a and the second processor core 2b are tamperprotected with different measures (e.g., no additional protection, casting with epoxy resin, fitting of a protective metal sleeve on the motherboard). This offers the advantage that an attacker may have to bypass the different tamper protection measures simultaneously for an unnoticed attack.

According to the embodiment depicted in FIG. 1, the cross-correlation (e.g., peak) exceeds a predefinable threshold value in order to detect a correct operation. In a different variant, both the autocorrelation function and the cross-correlation function are calculated. Depending on the autocorrelation (e.g., peak), the threshold value is determined, e.g. 0.5*peak_autocorrelation or 0.7*peak_autocorrelation. In one variant, time shift information, (e.g., the temporal position of the main peak), is furthermore determined through cross-correlation. A correct operation is identified if the time shift determined in this way lies within a predefinable time interval.

In a further variant, if no common clock is present for the two redundant processor cores 2a, 2b, the clock generation of the two redundant processor cores 2a, 2b is adjusted. The time shift may be determined by the cross-correlation of the current consumption. The time shift serves as the input of a control loop for the clock generation. A temporal drifting apart of two identical, redundant processor cores 2a, 2b in each case with autonomous clock generation may thus be prevented.

The example embodiment depicted in FIG. 1 discloses a device 1 for the monitoring (e.g., automatic monitoring) of a component 2. The component 2 includes at least one processor core 2a. The device 1 includes the component 1 and/or 2 to be monitored, a further processor core 2b, a determination unit 4 and a comparison unit 5. The determination unit 4 is designed to determine a profile of the processor core 2a. The profile is influenced by an input signal 3a applied to the processor core 2a. The determination unit 4 is furthermore designed to determine a further profile of the further processor core 2b. The further profile is influenced by a further input signal 3b applied to the further processor core 2b. The comparison unit 5 is designed to compare the profile and the further profile and generate a fault signal 6 as a status signal if a comparison result of a comparison carried out by the comparison unit 5 is an insufficient similarity between the profile and the further profile.

According to one example embodiment, the component 2 and/or the device 1 may be automatically monitored according to the following method. An input signal 3a is applied to the processor core 2a. A further input signal 3b is applied to the further processor core 2b. A profile of the processor core 2a influenced by the application of the input signal 3a to the processor core 2a and a further profile of the further processor core 2b influenced by the application of the further input signal 3b to the further processor core 2b are (e.g., automatically) determined. The profile and the further profile are (e.g., automatically) compared. An insufficient similarity between the profile and the further profile is (e.g., automatically) interpreted as an indication of a malfunction of the component, for example through the output of a status signal 6 designed as a fault signal.

If the comparison reveals a sufficient similarity between the profile and the further profile, this is (e.g., automatically) interpreted as an indication of a fault-free operation of the component 1 or 2. The comparison unit 5 may be designed to generate no fault signal as a status signal 6 if a comparison result of the comparison carried out by the comparison unit 5 is a sufficient similarity between the profile and the further profile. The comparison unit may output no status signal or a status signal 6 that indicates that the comparison unit 5 has identified no fault in the component 2.

The determination unit 4 may include a current-measuring unit 4a, 4b or a current-measuring unit for the processor core 2a and/or the further processor core 2b. The profile and the further profile thus include or are in each case a variation with time in the power input or a current consumption profile of the respective processor core 2a, 2b. The measurement of the power input or the current consumption profile of the respective processor core may be determined, for example, by electromagnetic radiation of the respective processor core or a shunt for the respective processor core.

According to one embodiment, the comparison unit 5 includes a cross-correlator 5a and a comparator 5b. The cross-correlator determines the cross-correlation of the determined profile of the processor core 2a and the determined profile of the further processor core 5b. The comparator compares the result of the determined cross-correlation with a threshold value 8. If the result of the determined cross-correlation is less than the threshold value, this is interpreted as a malfunction of the component 2 in that a fault signal is supplied as a status signal 6. The comparison unit 5 is thus designed to carry out the comparison by a determination of a cross-correlation of the profile and the further profile. Alternatively, the comparison may also be carried out by a different feature extraction, such as, for example, by a comparison of the mean values and/or the peak values and/or the frequency spectrum of the profile and the further profile. The measured time profile, for example, is transformed (e.g., with FTT Fourier transformation) and the transformed signal is analyzed. The cross-correlator 5a and the comparator 5b do not necessarily have to be integrated in a comparison unit 5 designed as a uniform component, as depicted in FIG. 1. The comparison unit 5 may also include a cross-correlator 5a designed as a separate component and a comparator 5b designed as a separate component.

According to one embodiment, the insufficient similarity between the profile and the further profile is determined by a threshold value. A degree of similarity, for example, is determined, the determined degree of similarity is compared with the threshold value and, if the threshold value is exceeded or understepped, a fault signal is supplied.

According to one embodiment, as in the example embodiment depicted in FIG. 1, the signals 3a, 3b applied to the processor core 2a and to the further processor core 2b are identical and/or simultaneous. The advantage of an identical signal 3 on both processor cores 2a, 2b (in contrast, for example, to a comparison of a current consumption profile of the processor core with a stored reference current consumption profile) is that the same signal is present on both processor cores and therefore a difference between the profiles of the two processor cores indicates with a high probability a malfunction of the component 2. In other words, it is then irrelevant which input signal is applied and the threshold value 8 at which a malfunction of the component 2 is established may be set lower.

According to a further embodiment, the input signal 3a and the further input signal 3b are coded differently, but may have the same content. In such a case, it may be expected that the two processor cores behave identically apart from the decoding work, thereby still allowing a lower threshold value 8 than in the case of a comparison of the profile with a reference profile stored on a different input signal. The advantage of the different coding (e.g., coding as bitwise inverse value, as complementary value or as masked value, e.g., addition and/or multiplication with masking value) is that specific hardware faults may be detected (e.g., one bit is set to 0 or 1).

In a further variant, a permanently stored replacement signal 3b is selected depending on the input signal 3a. This has the advantage that attacks that cause malfunction due to invalidly coded input signals may be detected since only stored and therefore reliably validly coded input signals may be supplied to the second component.

The input signal applied to the first processor core and the input signal applied to the second processor core may be applied simultaneously (e.g., as depicted in FIG. 1) or, on the other hand, time-shifted (e.g., delayed). The advantage of a simultaneous application of a (e.g., identical) signal to both processor cores 2a, 2b is that the result may be determined in real time. The advantage of a time-shifted application is that a temporary fault caused, e.g., by electromagnetic irradiation may be detected if the input signal is processed with a time delay, e.g., if the fault takes effect at different times of the input signal, and therefore the cross-correlation of the profile and the further profile is reduced.

The comparison unit 5 may be designed to determine a time shift between the profile and the further profile. In this embodiment, the insufficient similarity is established if the determined time shift exceeds a time shift threshold value 8. The advantage of this embodiment is that a temporal malfunction may be detected. In control systems, not only is the functionally correct result important, but it is also provided that a control signal is output at the correct time.

The two processor cores may have an identical or a different clock. According to one further embodiment, in the case of a different or time-delayed clock, the device 1 includes an adjustment designed to reduce the time shift of the clocks of the processor core 2a and/or the further processor core 2b.

In the case of an insufficient similarity between the profile and the further profile, any given selection of the following measures may be undertaken: (1) outputting a fault signal or alarm signal as a status signal 6; (2) performing a restart of the device 1 and/or the component 2 and/or a system monitored by the component 2; (3) switching the device 1 and/or the component 2 and/or a system monitored by the component 2 to an intrinsically safe state and/or to a restricted operating mode; (4) performing additional checks; and/or (5) deleting, invalidating, or updating a cryptographic key, e.g., if it is assumed that the key may be known to an attacker.

As an alternative to the example embodiment depicted in FIG. 1, the device 1 does not have to be a multi-processor component, since the further processor core 2b may also be included by a further component separate from the component 1.

The processor core 2a and the further processor core 2b may be redundantly operable. This means that they are operated in a functionally identical manner. This has the advantage that the current consumptions of the first and second processor cores have a very high correspondence during correct operation. The processor cores 2a and 2b may be identical components. Alternatively, the processor cores 2a and 2b may be different, but functionally identical components, e.g., processor cores from different manufacturers or processor cores that have been implemented at different production plants or by different production technologies. This has the advantage that a malfunction of only one processor core is detectable. Thus, for example, the case may be detected where a manufacturer has produced a processor core defectively or with an unwanted additional functionality (e.g., hardware Trojan, backdoor). If a defective or unwanted function of this type is used in runtime, this may be detected by the different current consumption of the processor core 2a and the processor core 2b.

According to one embodiment, redundant components are monitored through cross-correlation of the current consumption profiles. Any given methods for signal processing and pattern recognition are fundamentally applicable. Thus, for example, features of the current consumption profiles may be extracted with algorithms known from pattern recognition and may be compared for correspondence.

According to certain embodiments, the correct function of the device may be monitored without providing special data interfaces on the main CPU, in contrast, for example, to the SPI interface of the main CPU in the Infineon Safety Monitor.

According to certain embodiments, the monitoring may be added without repercussions in the case of available old equipment. Only a current consumption sensor is added. A real-time system or safety-critical system, for example, may then be monitored without having to modify the main functionality. The approach is thereby applicable e.g. in the case of old equipment. The approach is also applicable if an approval (e.g., safety) is required or an update, (e.g., virus pattern), is not permissible or practicable.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for monitoring a component, the method comprising:
    applying an input signal to a processor core of the component;
    applying a further input signal to a further processor core;
    determining a profile of the processor core influenced by the application of the input signal to the processor core;
    determining a further profile of the further processor core influenced by the application of the further input signal to the further processor core;
    comparing the profile and the further profile, wherein an insufficient similarity between the profile and the further profile is interpreted as an indication of a malfunction of the component,
    wherein, in a case of the insufficient similarity between the profile and the further profile,
        a cryptographic key is deleted, invalidated, or updated.
2. The method as claimed in claim 1, wherein a sufficient similarity between the profile and the further profile is interpreted as an indication of a fault-free operation of the component.

3. The method as claimed in claim 1, wherein the profile and the further profile in each case comprise or are a variation with time in a power input or in each case a variation with time in a current consumption of the respective processor core.

4. The method as claimed in claim 1, wherein the comparison of the profile and the further profile is performed by a determination of a cross-correlation of the profile and the further profile by a different feature extraction.

5. The method as claimed in claim 4, wherein the comparison is a comparison of one or more of mean values, peak values, or a frequency spectrum of the profile and the further profile.

6. The method as claimed in claim 1, wherein the insufficient similarity between the profile and the further profile is determined by a threshold value.

7. The method as claimed in claim 1, wherein a time shift between the profile and the further profile is determined, and wherein the insufficient similarity indicates that a time shift threshold value is exceeded by the determined time shift.

8. The method as claimed in claim 7, wherein the time shift between the profile and the further profile is reduced by an adjustment of a clock of the processor core, a clock of the further processor core, or the clock of the processor core and the clock of the further processor core.

9. The method as claimed in claim 1, wherein the component comprises the further processor core.

10. The method as claimed in claim 1, wherein the processor core and the further processor core are operated redundantly.

11. The method as claimed in claim 1, wherein the determining of the profile and the determining of the further profile is performed by the component.

12. The method as claimed in claim 1, wherein the input signal and the further input signal are identical.

13. The method as claimed in claim 1, wherein the input signal and the further input signal are coded differently.

14. The method as claimed in claim 13, wherein the input signal and the further input signal have identical content.

15. The method as claimed in claim 1, wherein the input signal and the further input signal are applied simultaneously to the processor core or to the further processor core.

16. The method as claimed in claim 1, wherein the input signal and the further input signal are applied with a time shift to the processor core or to the further processor core.

17. The method as claimed in claim 1, wherein the component is switched into an intrinsically safe state.

18. The method as claimed in claim 1, wherein the component is switched into a restricted operating mode.

19. A device for monitoring a component, the device comprising:
   the component to be monitored, the component comprising at least one processor core;
   a further processor core;
   a determination unit configured to determine a profile of the processor core influenced by an input signal applied to the processor core and a further profile of the further processor core influenced by a further input signal applied to the further processor core;
   a comparison unit configured to compare the profile and the further profile and to generate a fault signal when a comparison result of a comparison carried out by the comparison unit is an insufficient similarity between the profile and the further profile,
   wherein the device is configured, in a case of an insufficient similarity between the profile and the further profile:
      to delete, invalidate, or update a cryptographic key.

20. The device as claimed in claim 19, wherein the comparison unit is configured to generate no fault signal when a comparison result of the comparison carried out by the comparison unit is a sufficient similarity between the profile and the further profile.

21. The device as claimed in claim 19, wherein the determination unit comprises a current-measuring unit or a power-measuring unit for the processor core, the further processor core, or the processor core and the further processor core.

22. The device as claimed in claim 19, wherein the comparison unit is designed to carry out the comparison by a determination of a cross-correlation of the profile and the further profile or by a different feature extraction.

23. The device as claimed in claim 22, wherein the comparison is a comparison of one or more of mean values, peak values, or a frequency spectrum of the profile and the further profile.

24. The device as claimed in claim 19, wherein the comparison unit is configured to establish the insufficient similarity of the profile and the further profile by a threshold value.

25. The device as claimed in claim 19, wherein the comparison unit is configured to determine a time shift between the profile and the further profile, and wherein the insufficient similarity indicates that a time shift threshold value is exceeded by the determined time shift.

26. The device as claimed in claim 25, comprising an adjustment configured to reduce the time shift of clocks of the processor core, the further processor core, or the processor core and the further processor core.

27. The device as claimed in claim 19, wherein the component comprises the further processor core.

28. The device as claimed in claim 19, comprising a further component that comprises the further processor core.

29. The device as claimed in claim 19, wherein the processor core and the further processor core are redundantly operable.

30. The device as claimed in claim 19, wherein the component comprises the determination unit or an additional determination component comprises the determination unit.

31. The device as claimed in claim 19, wherein the input signal and the further input signal are identical.

32. The device as claimed in claim 19, wherein the input signal and the further input signal are coded differently.

33. The device as claimed in claim 32, wherein the input signal and the further input signal have a same content.

34. The device as claimed in claim 19, wherein the input signal and the further input signal are applicable simultaneously to the processor core or to the further processor core.

35. The device as claimed in claim 19, wherein the input signal and the further input signal are applicable with a time shift to the processor core or to the further processor core.

* * * * *